United States Patent
Engel et al.

(10) Patent No.: US 8,026,810 B2
(45) Date of Patent: Sep. 27, 2011

(54) DEVICE FOR CONTROLLING AND MONITORING SEQUENTIAL SUBSECTIONS OF AN INSTALLATION

(75) Inventors: Markus Engel, Nürnberg (DE); Reinhard Hoffmann, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 386 days.

(21) Appl. No.: 12/300,191

(22) PCT Filed: May 8, 2007

(86) PCT No.: PCT/EP2007/054431
§ 371 (c)(1), (2), (4) Date: Nov. 10, 2008

(87) PCT Pub. No.: WO2007/131910
PCT Pub. Date: Nov. 22, 2007

(65) Prior Publication Data
US 2009/0102647 A1    Apr. 23, 2009

(30) Foreign Application Priority Data

May 11, 2006  (DE) .................. 10 2006 023 329

(51) Int. Cl.
*G08B 21/00* (2006.01)
(52) U.S. Cl. .................. 340/540; 340/668; 340/501
(58) Field of Classification Search .......... 340/540–541, 340/644, 668, 666, 564–565, 548, 555, 567, 340/517, 521–522, 501
See application file for complete search history.

(56) References Cited

U.S. PATENT DOCUMENTS

| | | | | | |
|---|---|---|---|---|---|
| 5,680,544 | A | * | 10/1997 | Edmondson et al. | 714/42 |
| 5,712,514 | A | * | 1/1998 | Fischperer et al. | 307/69 |
| 5,852,402 | A | * | 12/1998 | Perry | 340/541 |
| 6,411,049 | B1 | | 6/2002 | Fischperer | |
| 6,807,845 | B2 | * | 10/2004 | Halbinger et al. | 73/37.5 |

FOREIGN PATENT DOCUMENTS

| | | |
|---|---|---|
| DE | 19615596 A1 | 11/1996 |
| DE | 19748911 A1 | 5/1999 |
| EP | 1050427 A2 | 11/2000 |
| JP | 07046715 A | 2/1995 |

OTHER PUBLICATIONS

Written Opinion of the International Searching Authority dated Apr. 2005.

* cited by examiner

*Primary Examiner* — Daniel Previl
(74) *Attorney, Agent, or Firm* — Laurence A. Greenberg; Werner H. Stemer; Ralph E. Locher

(57) ABSTRACT

A device for controlling and monitoring an installation that is composed of sequentially disposed sub-sections in a chain so that each sub-section lies between a forward sub-section and a rearward sub-section, with the exception of the terminal sub-sections of the installation. Each sub-section is connected to a first control unit and a second control unit and the control units of the sub-sections communicate at least partially with one another, with the sub-sections, and/or with a higher-level control center. Increased safety requirements are satisfied with the novel device, while at the same time being cost-effective, in that the first control unit is also connected to the forward sub-section and the second control unit is also connected to the rearward sub-section.

7 Claims, 2 Drawing Sheets

DEVICE FOR CONTROLLING AND MONITORING SEQUENTIAL SUBSECTIONS OF AN INSTALLATION

BACKGROUND OF THE INVENTION

Field of the Invention

The invention relates to an apparatus for controlling and monitoring an installation which is composed of subsections which are arranged one behind the other in the form of a chain, such that each subsection with the exception of the subsections of the end of the installation is arranged between a front subsection and a rear subsection, with each subsection being connected to a first monitoring unit and to a second monitoring unit, and with at least some of the monitoring units of the subsections communicating with one another, with the subsections themselves and/or with a superordinate control point.

By way of example, an apparatus such as this is already known from the special issue of ZEV Glasers Annals, special issue "Transrapid 2003". By way of example, said special issue from the applicant describes the linear motor which is used to drive a magnetic levitation vehicle being arranged in the track and being subdivided into track sections. The track sections are connected to a power supply system via track section switches, with the only track section which is connected to the power supply system being that in which the train to be driven is respectively located. Furthermore, the track section switches can also be used for safety reasons in that the switches are operated, for example, in the event of a short circuit in order to isolate the faulty track section from the power supply system. A protective device which is known per se is used as a monitoring unit in order to identify a short-circuit current and is connected to measurement transmitters which allow the detection of electrical state variables in the track section.

BRIEF SUMMARY OF THE INVENTION

The invention is based on the object of providing an apparatus of the type mentioned initially which is compliant with more stringent safety requirements and at the same time is cost-effective.

The invention achieves this object in that the first monitoring unit is also connected to the front subsection and the second monitoring unit is also connected to the rear subsection.

According to the invention not just two monitoring units are associated with each subsection. In fact, within the scope of the invention, monitoring units which are associated with directly adjacent subsections can intervene, for example in the event of a fault, in the monitoring of the faulty subsection. This enhances the safety of the overall installation in a cost-effective manner. The failure of a monitoring unit is signaled to the monitoring unit which intervenes for it on the one hand via the communication system which is provided between the monitoring units. As an alternative to this, the subsection which is connected to the faulty monitoring unit signals the failure to the intervening monitoring unit. A communication system between the monitoring units comprises communication links which are not cable-based, such as radio or the like, or else cable-based communication links.

The first monitoring unit is advantageously a control unit, and the second monitoring unit a protective device. By way of example, the control unit is used to connect the subsection at a precise time to an expedient power supply. By way of example, the protective device is used to bridge the subsection or to isolate the subsection from the power supply in the event of a fault, thus making it possible to prevent damage to that subsection in the event of excessively high currents, for example in the case of a short circuit. In general, the control unit is used to control a process which is carried out by the installation.

The monitoring units are expediently arranged physically adjacent to the respectively associated subsection. In particular, it is expedient to arrange the first monitoring unit physically at the interface between the front subsection and the directly associated subsection, with the second monitoring unit being arranged at the interface between the directly associated subsection and the rear subsection. This makes it possible to avoid long connecting lines between a subsection and monitoring unit.

The monitoring units are expediently connected to measurement sensors. The measurement sensors are designed to detect an electrical variable or else other variables, for example the current, the voltage on a stator winding, the ambient temperature, the air humidity or the like. The respective measurement variable detected by the measurement sensors is advantageously transmitted in the form of a measurement signal to the monitoring unit, with the measurement signal then being sampled, for example by a sampling unit, in order to obtain sample values, and the sample values being supplied to a computation unit of the monitoring unit in order to obtain digital measurement variables. The computation unit has internal configurable logic with whose aid the monitoring unit monitors the measured values, for example for the presence of fault conditions.

According to a further refinement, each monitoring unit comprises a control unit and a protective unit. According to one expedient further development relating to this, the control unit of the first monitoring unit is active, and the control of the second monitoring device is passive. In contrast, the protective unit of the first monitoring unit is passive, while the protective unit of the second monitoring unit is active. This corresponds to a known redundant configuration of control and protective units. However, for the purposes of the invention, the safety of the installation is enhanced even further since a redundant design of the protective and control functions is not just provided within one subsection. In fact, the control and/or the protection of a subsection are/is possible even when both the first and the second monitoring unit of the subsection have failed. In this case, within the scope of the invention, the control of the monitoring units is transferred to the adjacent subsections.

According to one preferred refinement of the invention, each monitoring unit is connected by means of a switch to the respective subsection and comprises a protective device which is connected to at least one measurement sensor for detection of an electrical variable in one of the subsections, with the protective device being designed to initiate the switch as a function of the electrical measurement variable. In this case, for example, the subsection is a stator section of a long stator, as is the case by way of example in conjunction with the drive for a magnetic levitation vehicle. In this case, the stator section is connected by means of a switch or switches to at least one converter which supplies electrical drive power when the magnetic levitation vehicle is located within the stator section. Each stator section may have two respectively associated three-pole switches, with one of the switches grounding the star point of the polyphase stator winding when in its contact position.

The monitoring units are advantageously connected to one another via at least one communication line. The communication may, of course, be passed via a plurality of lines or else via a single communication line. In this case, any desired communication lines may be used, such as optical waveguides for optical data interchange.

Communication techniques which are not cable-based, for example radio, can also be used within the scope of the invention. In this case, a central control point is expediently used as a node for communication interchange. Alternatively, direct communication is possible between the monitoring units, within the scope of the invention.

Further expedient refinements and advantages of the invention are the subject matter of the following description of exemplary embodiments of the invention with reference to the figures in the drawing, in which the same reference symbols refer to components having the same effect, and in which:

DESCRIPTION OF THE INVENTION

Figure 1:
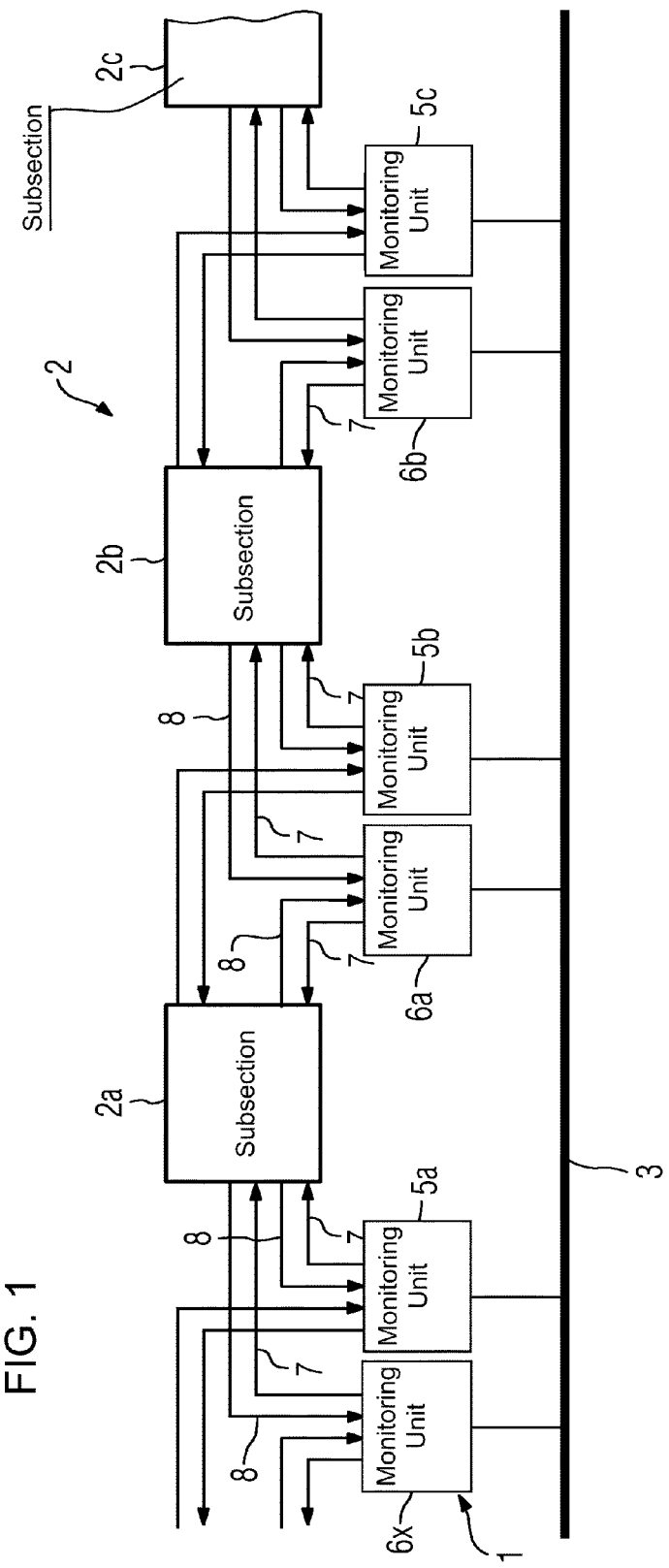
FIG. 1 shows one exemplary embodiment of the invention, illustrated schematically.

FIG. 1 shows one exemplary embodiment of the apparatus 1 according to the invention, which is provided for controlling and monitoring an installation 2, with the installation 2 comprising subsections 2a to 2c which are arranged in a row in the form of a chain. The subsections 2a, 2b, 2c are, for example, stator sections of a long stator which is arranged as a linear motor in the track of a magnetic levitation vehicle. The apparatus 1 comprises monitoring units which are each associated with a subsection 2a or 2b. For example, the subsection 2b has an associated first monitoring unit 5b and an associated second monitoring unit 6b. In principle, the first monitoring unit 5b is any desired mechanical or electronic component by means of which, for example, a switching process can be initiated or by means of which an electrical signal or power can be fed into the associated subsection 2b.

Each monitoring unit is advantageously connected to a measurement sensor, for example a temperature sensor, by means of which the temperature can be detected at the start of the subsection 2b, or at its end. The temperature is supplied in the form of a temperature signal 8 via a communication line to the respective monitoring unit 5b or 6b. Furthermore, the monitoring units are connected to one another via a communication line 3 in such a way that specific status information or data can be interchanged between the monitoring units 5, 6. In the exemplary embodiment shown in FIG. 1, each first monitoring unit is a control unit 5b, and each second monitoring unit is a protective device 6b.

In order to avoid having to interrupt the operation of the installation 2 until the fault is rectified in the event of failure of the control unit 5b, the control unit 5c is also connected by means of a communication line 3 to the front subsection 2b. In another exemplary embodiment of the invention, which is not illustrated in the figures, there is no communication between the monitoring units. Instead of this, the subsection which is connected to the faulty monitoring unit signals the failure to the monitoring unit which is intended to replace the faulty monitoring unit. In this case, the communication then takes place with the subsections themselves.

In the illustrated exemplary embodiment, each monitoring unit monitors the status of the monitoring units that are directly adjacent to it, by means of known checking routines. For this purpose, each monitoring unit accesses the adjacent monitoring units in order to check their serviceability, for example at fixed time intervals. The connecting lines are also checked during this process. In the event of a fault, the adjacent sound monitoring unit takes over the tasks and functions of the faulty monitoring unit. This results in a redundant arrangement, and enhances the monitoring safety.

Figure 2:
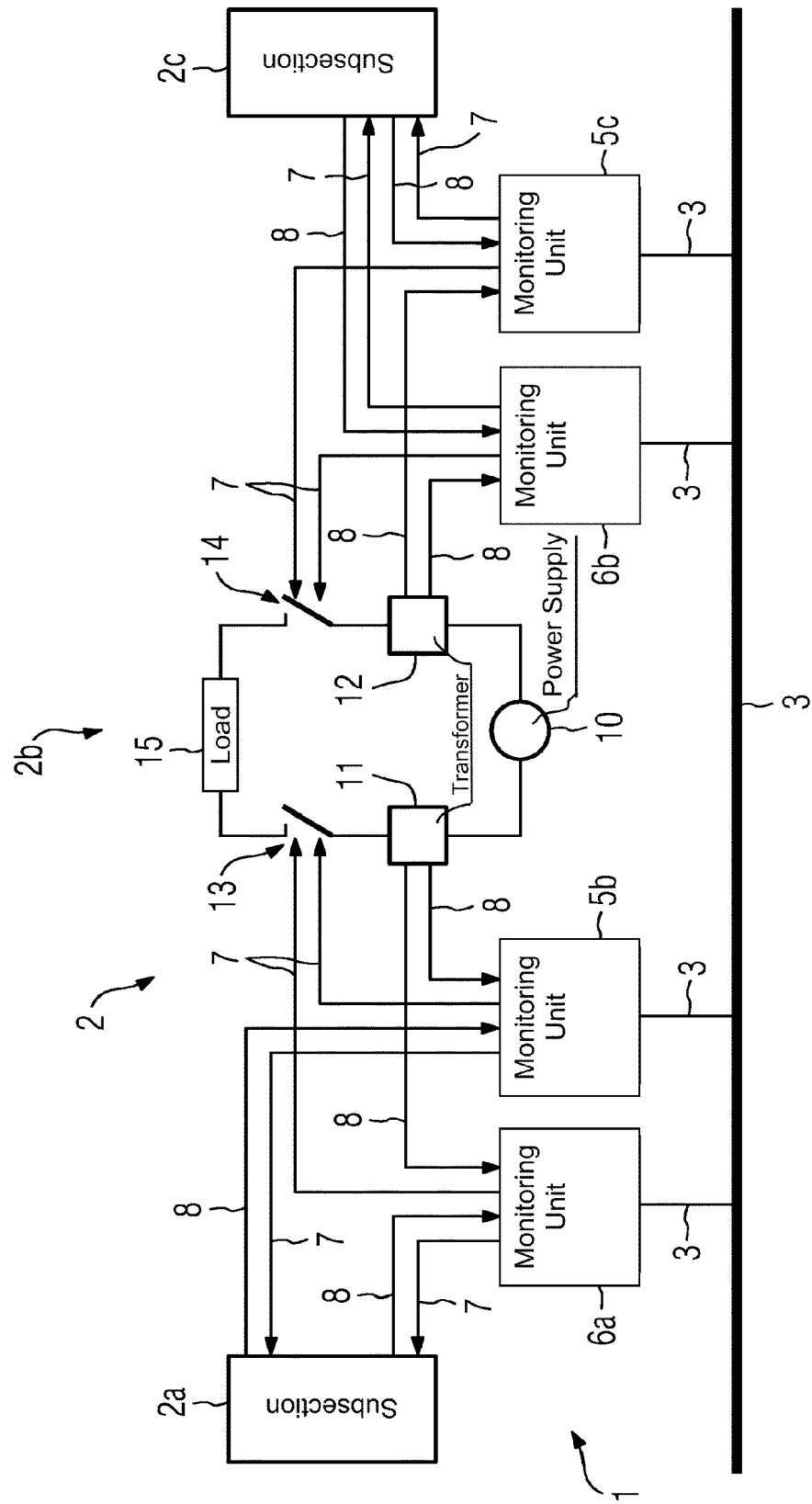
FIG. 2 shows a further exemplary embodiment of the apparatus according to the invention.

FIG. 2 shows a further exemplary embodiment of the apparatus 1 according to the invention, which is once again designed to monitor subsections 2a, 2b and 2c of an installation 2. However, FIG. 2 illustrates only the configuration of one subsection 2b in more detail. As can be seen, the subsections have a load 15 which in the illustrated exemplary embodiment is in the form of a stator winding on the track of a magnetic levitation vehicle. In this case, the load can be connected via switches 13 and 14 to a power supply 10 such that, when contact is made in the switches 13 and 14, the stator winding 15 is excited and a magnetic levitation vehicle which is located in the subsection 2b is driven. It should be noted that the motor winding is designed in a polyphase form, although only one phase is illustrated in FIG. 2, for clarity reasons. By way of example, the power supply 16 is a feeding converter.

In the exemplary embodiment of the apparatus 1 according to the invention that is illustrated in FIG. 2, the monitoring units 5b and 6b are respectively a control unit and a protective unit and are connected via communication lines 3 to a control point which is not illustrated in the figures. The control point is continuously informed of the location where the magnetic levitation vehicle is located within the installation 2. When the magnetic levitation vehicle goes over the interface between the subsection 2a and the subsection 2b, the control point addresses the control and protective units 5b and 6b, in response to which they close the switches 13 and 14 by means of initiation signals 7. The switches 13 and 14 are then in a contact position, as a result of which the stator windings are excited and the magnetic vehicle is driven in the subsection 2b.

High currents, for example in the event of a short circuit, may, however, lead to damage to the power supply 10 or to further components of the installation 2. Measurement sensors 11 and 12 are provided for this reason and are connected to the control and protective units 5b and 6b, respectively. In the exemplary embodiment shown in FIG. 2, the measurement sensors are calibrated current transformers which produce an output signal 8 which is proportional to the current flowing in the stator winding 15 and is supplied respectively to the first control and protective unit 5b or to the second control and protective unit 6b. Once the sample values obtained in this way have been sampled and digitized by the respective control and protective unit 5b, 6b, each control and protective unit 5b, 6b has digital measured current values which this unit checks on the basis of internal logic for the presence of fault conditions. If a fault is found, the respective protective unit of the respective control and protective unit 5b or 6b produces an initiation signal 7 to open the respective switches 13 and 14. This interrupts the current flow.

As can also be seen in FIG. 2, each current transformer 11 and 12 is connected not only to a respective control and protective unit 5b and 6b, which can be directly associated with the same subsection 2b, but furthermore also to an open-loop and closed-loop control unit 6a or 5c, respectively, which are associated with respectively directly adjacent subsections 2a and 2c. This increases the redundancy, and therefore enhances the safety for the installation 2.

The invention claimed is:

1. An apparatus for controlling and monitoring an installation,
wherein the installation is composed of a plurality of subsections sequentially disposed one behind another in a chain of subsections, each of the subsections, except for terminal subsections at the respective ends of the chain of subsections, is arranged between a forward subsection and a rearward subsection;
the apparatus comprising:
a plurality of monitoring units including a first monitoring unit and a second monitoring unit;
each of the subsections having a first monitoring unit and a second monitoring unit connected thereto;
said first monitoring unit also being connected to the forward subsection and the second monitoring unit also being connected to the rearward subsection; and
at least some of said monitoring units of the subsections communicating with one another, with the subsections themselves, and/or with a superordinate control point.

2. The apparatus according to claim 1, wherein said first monitoring unit is a control unit and said second monitoring unit is a protective device.

3. The apparatus according to claim 1, wherein each monitoring unit comprises a control unit and a protective unit.

4. The apparatus according to claim 1, wherein each monitoring unit is connected to the respective subsection by way of a switch and comprises a protective device connected to at least one measurement sensor for detection of an electrical variable in one of the subsections, and wherein the protective device is configured to trigger the switch as a function of the electrical measurement variable.

5. The apparatus according to claim 4, wherein at least some of the switches are connected to a power supply unit and are configured to supply power to the respective subsection.

6. The apparatus according to claim 1, which comprises at least one communication line connecting said monitoring units to one another.

7. A controlled and monitored installation, comprising:
a plurality of subsections sequentially disposed one behind another in a chain of subsections;
each of said subsections, except for terminal subsections at the respective ends of the chain of subsections, being arranged between a forward subsection and a rearward subsection;
a plurality of monitoring units including a first monitoring unit and a second monitoring unit;
each of the subsections having a first monitoring unit and a second monitoring unit connected thereto;
said first monitoring unit also being connected to said forward subsection and said second monitoring unit also being connected to said rearward subsection; and
wherein at least some of said monitoring units of said subsections communicate with one another, with said subsections themselves, and/or with a superordinate control point.

\* \* \* \* \*